United States Patent
Thangaraj et al.

(10) Patent No.: US 6,680,106 B1
(45) Date of Patent: Jan. 20, 2004

(54) MAGNETIC RECORDING MEDIA WITH RU CORROSION BARRIER LAYER

(75) Inventors: Raj Thangaraj, Fremont, CA (US); Charles Frederick Brucker, Pleasanton, CA (US); Huan Tang, Los Altos, CA (US); Jing Gui, Fremont, CA (US); Gary Rauch, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 71 days.

(21) Appl. No.: 10/127,771

(22) Filed: Apr. 23, 2002

Related U.S. Application Data

(60) Provisional application No. 60/337,386, filed on Nov. 8, 2001.

(51) Int. Cl.$^7$ .................................................. G11B 5/72
(52) U.S. Cl. ...................... 428/216; 428/336; 428/469; 428/694 TC; 428/694 TP
(58) Field of Search ................................ 428/216, 336, 428/469, 694 TP, 694 TC

(56) References Cited

U.S. PATENT DOCUMENTS

| | | | | |
|---|---|---|---|---|
| 4,774,130 A | * | 9/1988 | Endo et al. | 428/216 |
| 5,624,725 A | * | 4/1997 | Nelson et al. | 428/65.5 |
| 5,897,931 A | * | 4/1999 | Ahlert et al. | 428/65.5 |

FOREIGN PATENT DOCUMENTS

JP  08-203069  * 8/1996

* cited by examiner

Primary Examiner—Stevan A. Resan
(74) Attorney, Agent, or Firm—McDermott, Will & Emery

(57) ABSTRACT

Corrosion protection of magnetic recording media is achieved by providing a thin protective barrier layer comprising ruthenium on the magnetic layer. Embodiments include forming a corrosion barrier layer less than 10 Å of elemental ruthenium, a ruthenium oxide, a ruthenium alloy, a layer comprising mixed oxides of ruthenium and an alloying element, a composite of a ruthenium layer and a layer of ruthenium oxide or a composite of a ruthenium alloy layer and a layer of mixed oxides of ruthenium and an alloying element. A carbon containing an overcoat is then formed, as at a thickness of about 10 Å to 50 Å, on the corrosion protective layer.

20 Claims, 4 Drawing Sheets

MAGNETIC RECORDING MEDIA WITH RU CORROSION BARRIER LAYER

RELATED APPLICATION

This application claims priority from Provisional Patent Application Ser. No. 60/337,386 filed Nov. 8, 2001 entitled "MAGNETIC RECORDING MEDIA WITH Ru CORROSION BARRIER LAYER", the entire disclosure of which is hereby incorporated by reference herein.

TECHNICAL FIELD

The present invention relates to magnetic recording media, particularly rotatable recording media, such as thin film magnetic disks cooperating with a magnetic transducer head, particularly a magnetoresistive (MR) or a giant magnetoresistive (GMR) head. The present invention has particular applicability to high areal density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data-transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg) alloy, plated with a layer of amorphous nickel-phosphorus (NiP). Alternative substrates include glass, ceramic, glass-ceramic, and polymeric materials and graphite. The substrate typically contains sequentially deposited on each side thereof at least one seedlayer and/or at least one underlayer, such as chromium (Cr) or a Cr-alloy, e.g., chromium vanadium (CrV), a cobalt (Co)-based alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface. Conventional practices further include forming a servo pattern on the magnetic layer thereby producing topographical nonuniformities. Such servo patterns can be formed by photolithographic or laser techniques.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms the lubricant is typically dissolved in an organic solvent, applied and bonded to the carbon overcoat of the magnetic recording medium by techniques such as dipping, buffing, thermal treatment, ultraviolet (UV) irradiation and soaking.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require recording heads with narrower track width and reduced gap, reduced media noise and/or smaller flying heights, i.e., the distance by which the head floats above the surface of the disk in the disk drive or head-medium-spacing (HMS). For conventional media design, a decrease in HMS increases stiction and drive crash.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

The drive for high area recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions, such as cobalt (Co) and nickel (Ni), from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

The continuing drive for increased recording areal density in the magnetic recording media industry mandates reduction of the thickness of the protective overcoats, e.g., the carbon protective overcoat and lubricant film, since such layers constitute part of the FHMS. In order to satisfy the continuing drive for higher recording areal densities, the HMS requirement at, for example, 100 Gb/in$^2$ recording areal density, the protective overcoat thickness and the lubricant film thickness must be significantly reduced. However, as the thickness of such layers is reduced, as to near atomic levels to reduce the HMS, significant issues arise in that the continuity and integrity of the protective and lubricant films are difficult to maintain. Consequently, imperfections, e.g., discontinuities or openings, in the protective overcoats increase leading to degradation of recording performance due to environmental attacks, such as corrosion. Depending upon the corrosion mechanism, metallic cations, primarily cobalt from the magnetic layer, may diffuse to the surface of the carbon protective overcoat and react with absorbed species, such as oxygen and sulphur from elastomeric components of the drive mechanism, to form corrosion products. Alternatively, absorbed species may diffuse through the overcoat layer or through defects in the protective carbon film during manufacturing and react with cobalt. Thus, the corrosion problem prevents reduction of protective overcoats to a thickness less than the physical limit below which the films are no longer continuous, thereby significantly limiting reduction of the HMS required to increase areal recording density.

Another problem confronting the drive for increased areal recording density leading to corrosion problems stems from the formation of topographical patterns on the substrate, as by laser texturing or by photolithographic techniques, which are substantially reproduced in overlying layers. In order to increase areal recording density, both bit density and track density must be increased. However, when increasing track density to a high level, e.g., greater than 100,000 tracks per inch, the track becomes too narrow to be formed by conventional servo track writing techniques. Lithographic patterning techniques have been employed to create fine topographical patterns on a disk for servo purposes, wherein the track density can be increased significantly beyond 100,000 tracks per inch. However, the formation of such topographical patterns renders the medium more susceptible to environmental attacks, because it is extremely difficult to cover the surface of the magnetic layer containing such lithographic features with a thin layer of a protective overcoat, such as carbon, in addition to a thin lubricant layer. In addition, defective texturing, as by laser texturing, leads to incomplete coverage by the magnetic layer which result in greater defects and, hence, increased corrosion problems.

Accordingly, there exists a need for high areal density magnetic recording media having a significantly reduced HMS, while simultaneously exhibiting adequate resistance to environmental attacks, such as corrosion, and a need for enabling methodology.

DISCLOSURE OF THE INVENTION

An advantage of the present invention is a high areal recording density magnetic recording medium exhibiting improved corrosion resistance.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium comprising: a non-magnetic substrate; a magnetic layer over the substrate; a corrosion barrier layer comprising a ruthenium (Ru), having a thickness less than 10 Å, on the magnetic layer; and a carbon protective overcoat on the corrosion barrier layer.

Embodiments of the present invention comprise forming one or more underlayers, as for controlling grain epitaxy, between the substrate and magnetic layer, and employing one or more magnetic layers containing cobalt and chromium. Embodiments of the present invention include forming the corrosion barrier layer at a thickness of about 3 Å to about 9 Å, and forming the protective carbon overcoat at a thickness of about 10 Å to about 50 Å. Embodiments of the present invention include corrosion barrier layers consisting essentially of ruthenium-based alloys, such as ruthenium alloyed with one or more refractory metal alloying elements, corrosion barrier layers consisting essentially of a ruthenium oxide barrier layer, and corrosion barrier layers consisting essentially of a barrier layer comprising mixed oxides of ruthenium and one or more refractory metal alloying elements. Embodiments of the present invention also include composite barrier layers comprising a layer of ruthenium and a layer of ruthenium oxide thereon and composite barrier layers comprising a layer of a ruthenium-based alloy containing ruthenium and one or more refractory metal alloying elements and a layer thereon comprising mixed oxides of ruthenium and one or more refractory metal alloying elements. Typically refractory metal alloying elements include titanium (Ti), molybdenum (Mo), tungsten (W), niobium (Nb) and tantalum (Ta).

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
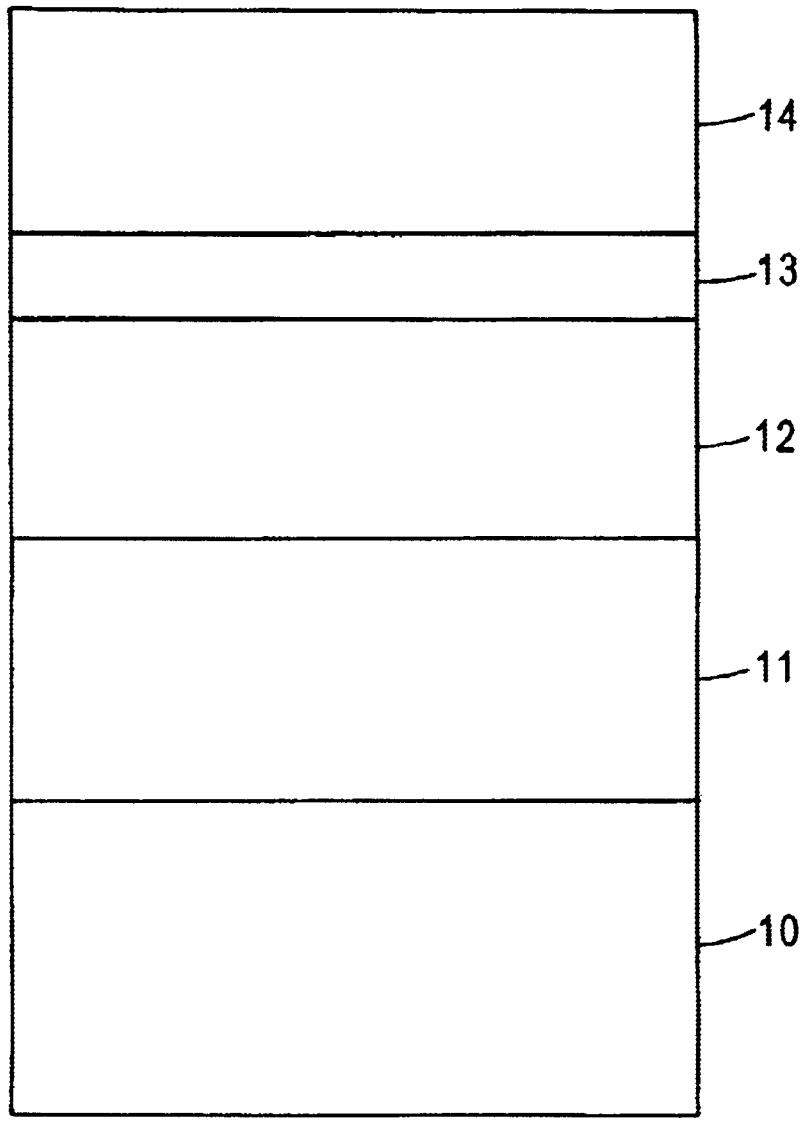
FIG. 1 schematically illustrates a magnetic recording medium in accordance with an embodiment of the present invention.

The present invention addresses and solves corrosion problems which arise when attempting to manufacture high areal density magnetic recording media having a sufficiently reduced HMS, such as increased corrosion attendant upon reducing the thickness of protective overcoats, e.g., due to imperfections in the protective overcoat system. The present invention addresses and alleviates such problems by strategically depositing a thin corrosion barrier layer comprising ruthenium at a thickness less than 10 Å, e.g., less than 5 Å. A suitable corrosion barrier layer thickness is about 3 Å to about 9 Å. The use of the expression "elemental ruthenium" refers to the elemental form of ruthenium as commercially available in unalloyed form, which may include small concentrations of impurities which do not affect its characteristics.

Corrosion barrier layers comprising ruthenium in accordance with embodiments of the present invention minimize the diffusion of anions to the magnetic layer interface from the environment, as well as the escape of cations from the magnetic layer interface. Embodiments of the present invention comprise forming a corrosion barrier layer consisting essentially of elemental ruthenium or an alloy of ruthenium and one or more refractory metals such as Ti, Mo, W, Nb and Ta. The refractory metal alloying element is typically incorporated at about 1 to about 50 at. %, such as about 10 to about 25 at. %. In other embodiments of the present invention the corrosion barrier layer consists essentially of ruthenium oxide. In other embodiments of the present invention, the corrosion barrier layer consists essentially of an oxidized ruthenium-based alloy containing mixed oxides of ruthenium and oxides of one or more refractory metal alloying elements, such as Ti, Mo, W, Nb, and Ta. As in the embodiment wherein the corrosion barrier layer consists essentially of a ruthenium-based alloy, the oxidized ruthenium-based alloy contains about 1 to about 50 at. % of the refractory metal alloying element, e.g., about 10 to about 25 at. % of the refractory metal alloying element.

In another embodiment of the present invention, the corrosion barrier layer comprises a composite of a ruthenium-based alloy layer or sub-layer on the magnetic layer and a mixed oxide layer or sub-layer comprising oxides of ruthenium and oxides of one or more of the refractory metal alloying elements, on the ruthenium-based alloy sub-layer. The composite corrosion barrier layer also has a thickness not greater than about 10 Å, such as less than about 5 Å, e.g., about 3 Å to about 9 Å.

Embodiments of the present invention employing a corrosion barrier layer comprising ruthenium encompass any of various types of magnetic recording media structures with various combinations of seedlayers and/or underlayers. Corrosion barrier layers in accordance with embodiments of the present invention can be deposited by any of various deposition techniques, such as DC or RF magnetron sputtering or by plasma enhanced chemical vapor deposition (PECVD). In accordance with embodiments of the present invention, carbon protective overcoats can be deposited, typically at a thickness of about 10 Å to about 50 Å, either by DC or RF magnetron sputtering, or by a high-energy carbon deposition technique, such as PECVD, ion beam deposition (IBD) or filtered catathodic arc deposition (FCA).

Embodiments of the present invention comprise magnetic recording media having conventional overcoats, conventional seedlayers and/or conventional underlayers, e.g., chromium and/or chromium alloy underlayers, and conventional magnetic alloy layers, particularly magnetic alloy layers containing cobalt and chromium, e.g., magnetic CoCrPtB alloys. Typically, the magnetic alloy layer contains in excess of 10 at. % chromium.

An embodiment of the present invention is schematically illustrated in FIG. 1 and comprises a conventional substrate 10, and conventional seedlayer(s) and/or underlayer(s) 11 formed over the substrate 10. Magnetic layer 12, typically a Co—Cr based magnetic alloy, formed at a suitable thickness, e.g., about 50 Å to about 500 Å, can comprise a CoCrPtB alloy. The thin corrosion barrier layer comprising ruthenium 13 is then deposited, followed by carbon protective overcoat 14. A lubricant topcoat (not shown) can then be applied.

Adverting to FIG. 1, in various embodiments of the present invention, corrosion barrier layer 13 is deposited at a thickness of 3 Å to 9 Å. In an embodiment of the present invention, corrosion barrier layer 13 consists essentially of ruthenium. In another embodiment of the present invention, corrosion barrier layer 13 consists essentially of ruthenium oxide, e.g., $RuO_2$, deposited by DC or RF magnetron reactive sputtering or PECVD.

In another embodiment of the present invention, corrosion barrier layer 13 consists essentially of a ruthenium-based alloy containing one or more refractory metal elements, such as Ti, Mo, W, Nb or Ta, deposited by DC or Rf magnetron sputtering or PECVD. The refractory metal alloying element can be incorporated in an amount of about 1 to about 50 at. %, e.g., about 10 to about 25 at. %. In another embodiment of the present invention, corrosion barrier layer 13 consist essentially of a layer of an oxidized ruthenium-based alloy, comprising mixed oxides of ruthenium and one or more refractory metal alloying elements such as Ti, Mo, W, Nb or Ta.

Figure 2:
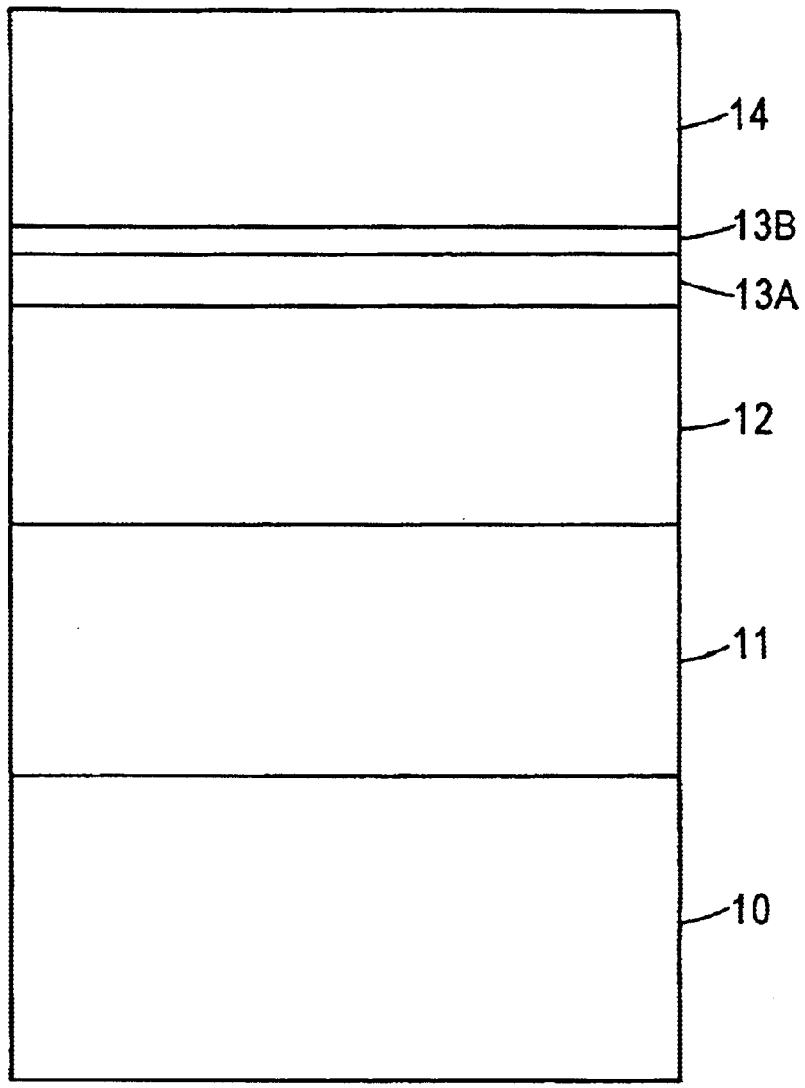
FIG. 2 schematically illustrates a magnetic recording medium in accordance with another embodiment of the present invention.

FIG. 2 schematically illustrates additional embodiments of the present invention. In FIGS. 1 and 2, similar elements or features are denoted by similar reference numerals. Adverting to FIG. 2, embodiments of the present invention include a composite of corrosion barrier comprising a sub-layer 13A consisting essentially of Ru and sublayer 13B of a layer consisting of essentially of ruthenium oxide. In other embodiments of the present invention, sublayer 13A is formed of a Ru-based alloy containing one or more refractory metals, such as Ti, Mo, W, Nb or Ta in an amount of about 1 to about 50 at. %, e.g., about 10 to about 25 at. %, and sublayer 13B of an oxidized layer of the previously mentioned ruthenium-based Ru-alloy containing mixed oxides of ruthenium and one or more refractory metals. The composite barrier layer including sublayer 13A and sublayer 13B has a thickness typically less than 10 Å, e.g., less than 5 Å, such as about 3 Å to about 9 Å.

Figure 3:
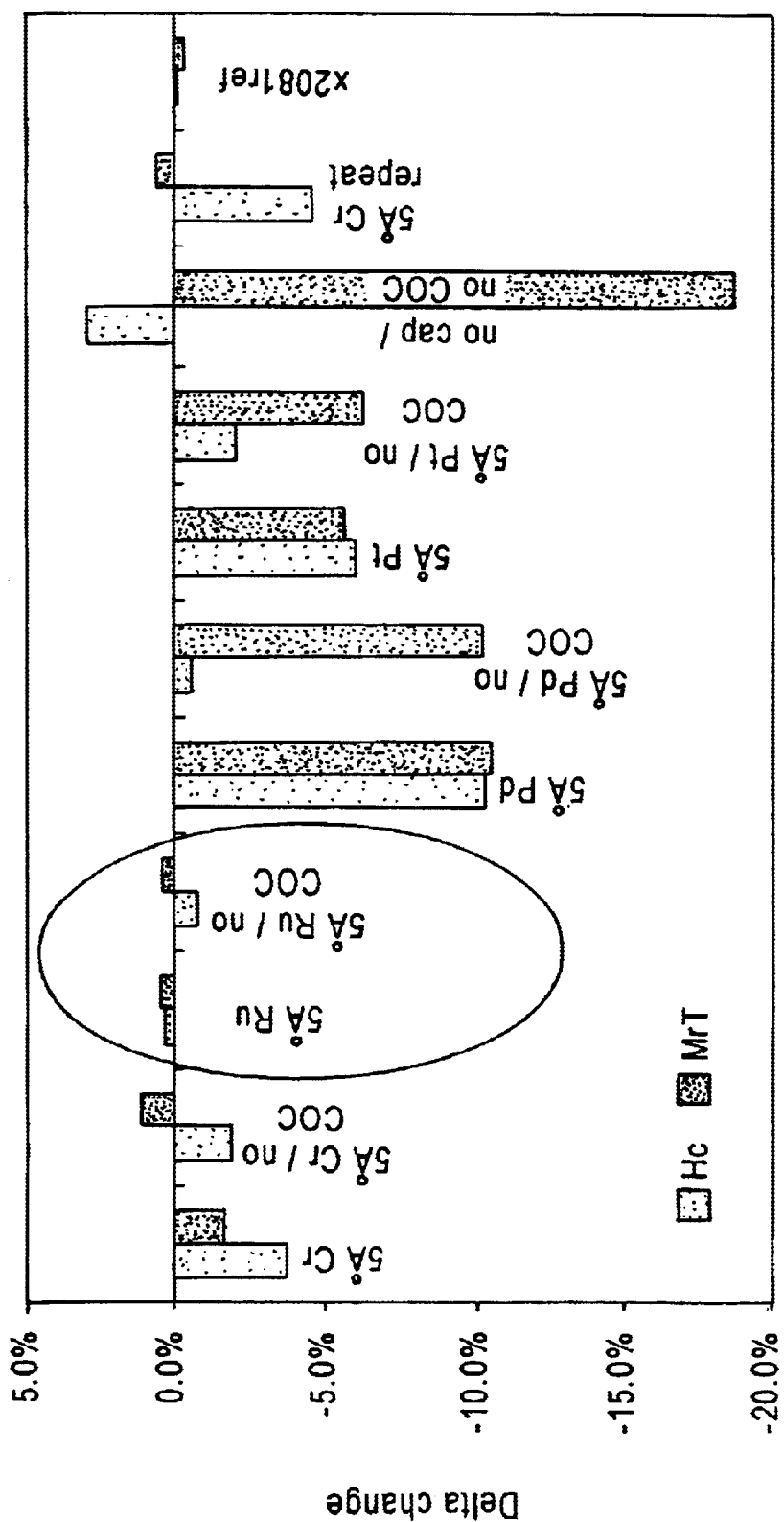
FIG. 3 is a bar graph comparing changes in magnetic properties for various media.

Testing was conducted to demonstrate the effectiveness of corrosion barrier layers in accordance with embodiments of the present invention and the results reported in FIG. 3. The data, which appear in FIG. 3, were obtained for magnetic remanence x thickness (MrT), coercivity (Hc) and magnetic squareness (S*) for corrosion barrier layers comprising ruthenium and a number of potential corrosion barrier layers. Ru barrier layer media, with and without a carbon overcoat, are circled.

It should be apparent from FIG. 3 that corrosion barrier layers comprising ruthenium exhibited the lowest Hc and MrT changes, after 80° C./80% relative humidity environmental tests, compared to the other barrier layers studied. In FIG. 3, COC denotes hydrogenated carbon, and all capping layers (corrosion barrier layers) were deposited at a thickness of 5 Å.

Figure 4:
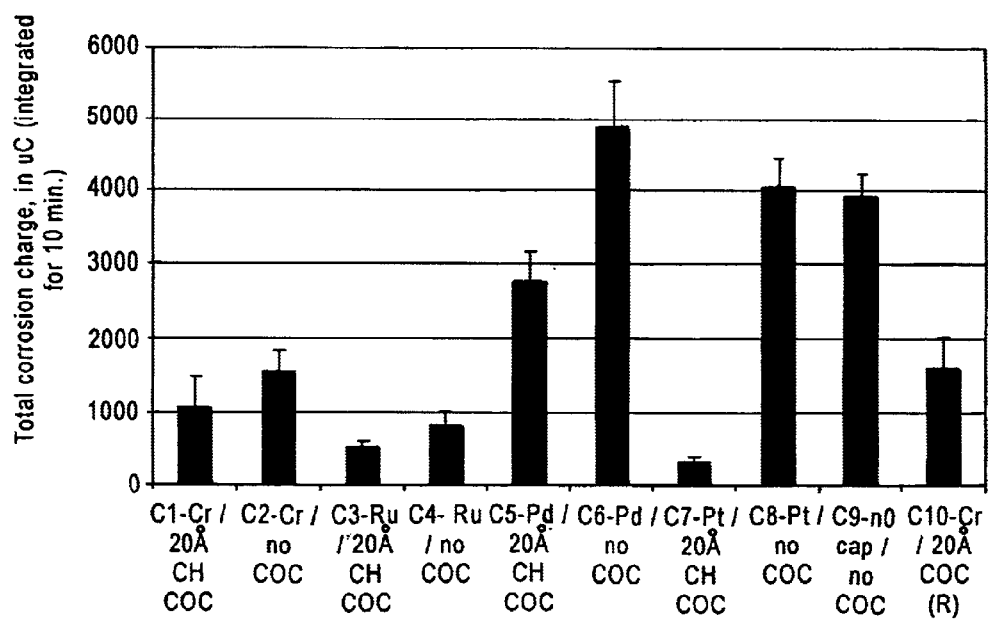
FIG. 4 contains potentiostatic corrosion data for media with different corrosion barrier layers.

In addition, corresponding potentiostatic corrosion data were obtained and appear in FIG. 4. The data in FIG. 4 further indicate that corrosion barrier layers comprising ruthenium exhibit superior corrosion performance vis-à-vis other potential corrosion barrier layers. The data in FIG. 4 were obtained employing a conventional Al/NiP substrate, a Cr/CoCr underlayer and a CoCrPtB magnetic layer.

In FIGS. 1 and 2, layers are depicted as formed sequentially on one side of substrate 10. However, consistent with conventional practices, the depicted layers are actually formed on both sides of the substrate but have been omitted from FIG. 1 for illustrative convenience. It should also be recognized that magnetic alloy layers suitable for use in the present invention include various magnetic alloys, e.g., various Co—Cr alloy systems. The present invention is not limited to any particular substrate material, seedlayer material, underlayer material, or number of seedlayers and underlayers, or to any particular protective overcoat or lubricant topcoat. Magnetic recording media in accordance with the present invention can be manufactured in conventional sputtering apparatus, including DC single disk sputtering apparatuses as well as in-line pass-by systems.

Embodiments of the present invention enable the manufacture of high areal density magnetic recording media with a significantly reduced HMS exhibiting improved corrosion resistance. In addition, the magnetic recording media in accordance with the present invention exhibit improved magnetic performance.

The present invention enjoys industrial utility in manufacturing any of various types of magnetic recording media, including thin film disks. The present invention is particularly applicable in producing high recording areal density magnetic recording media requiring a low flying height and exhibiting resistance to environmental attacks, such as corrosion.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:
    a non-magnetic substrate;
    a magnetic layer over the substrate;
    a corrosion barrier layer comprising ruthenium (Ru), having a thickness less than 10 Å, on the magnetic layer; and
    a carbon protective overcoat on the corrosion barrier layer.

2. The magnetic recording medium according to claim 1, comprising an underlayer between the substrate and the magnetic layer.

3. The magnetic recording medium according to claim 1, wherein the corrosion barrier layer has a thickness less than 5 Å.

4. The magnetic recording medium according to claim 1, wherein the corrosion barrier layer has a thickness of 3 Å to 9 Å.

5. The magnetic recording medium according to claim 4, wherein the carbon protective layer has a thickness of 10 Å to 50 Å.

6. The magnetic recording medium according to claim 4, wherein the corrosion barrier layer consists essentially elemental Ru.

7. The magnetic recording medium according to claim 4, wherein the corrosion barrier layer consists essentially of a ruthenium-based alloy.

8. The magnetic recording medium according to claim 7, wherein the ruthenium based alloy contains 1 to 50 at. % of titanium, molybdenum, tungsten, niobium or tantalum.

9. The magnetic recording medium according to claim 8, wherein the ruthenium based alloy contains 10 to 25 at. % of titanium, molybdenum, tungsten, niobium or tantalum.

10. The magnetic recording medium according to claim 4, wherein the corrosion barrier layer consist essentially of a layer of ruthenium oxide.

11. The magnetic recording medium according to claim 4, wherein the corrosion barrier layer consists essentially of an oxidized ruthenium alloy comprising mixed oxides of ruthenium and an alloying element.

12. The magnetic recording medium according to claim 11, wherein the ruthenium alloy contains ruthenium and 1 to 50 at. % of an alloying element selected from the group consisting of titanium, molybdenum, tungsten, niobium and tantalum.

13. The magnetic recording medium according to claim 12, wherein the ruthenium alloy contains 10 to 25 at. % of titanium, molybdenum, tungsten, niobium or tantalum.

14. The magnetic recording medium according to claim 4, wherein the corrosion barrier layer is a composite comprising:
    a sub-layer of elemental ruthenium on the magnetic layer; and
    a sub-layer of ruthenium oxide on the ruthenium sub-layer.

15. The magnetic recording medium according to claim 14, wherein the ruthenium oxide sub-layer comprises 5 to 15 percent of the thickness of the composite corrosion barrier layer.

16. The magnetic recording medium according to claim 4, wherein the corrosion barrier layer is a composite comprising:
    a sub-layer of an alloy comprising ruthenium and an alloying element on the magnetic layer; and
    a sub-layer comprising mixed oxides of ruthenium and the alloying element on the ruthenium alloy sub-layer.

17. The magnetic recording medium according to claim 16, wherein the ruthenium alloy contains 1 to 50 at. % of an alloying element selected from the group consisting of titanium, molybdenum, tungsten, niobium and tantalum.

18. The magnetic recording medium according to claim 17, wherein the ruthenium alloy contains 10 to 25 at. % of titanium, molybdenum, tungsten, niobium or tantalum.

19. The magnetic recording medium according to claim 16, wherein the mixed oxide sublayer is 5 to 15 percent of the thickness of the composite corrosion barrier layer.

20. A magnetic recording medium comprising:
    a magnetic layer; and
    means for protecting the magnetic layer against corrosion.

* * * * *